S. M. LILLIE.
APPARATUS FOR THE CONTINUOUS CONVERSION OF STARCH INTO GLUCOSE AND OTHER DERIVATIVES.
APPLICATION FILED APR. 15, 1912.
1,038,397.
Patented Sept. 10, 1912.
2 SHEETS—SHEET 1.
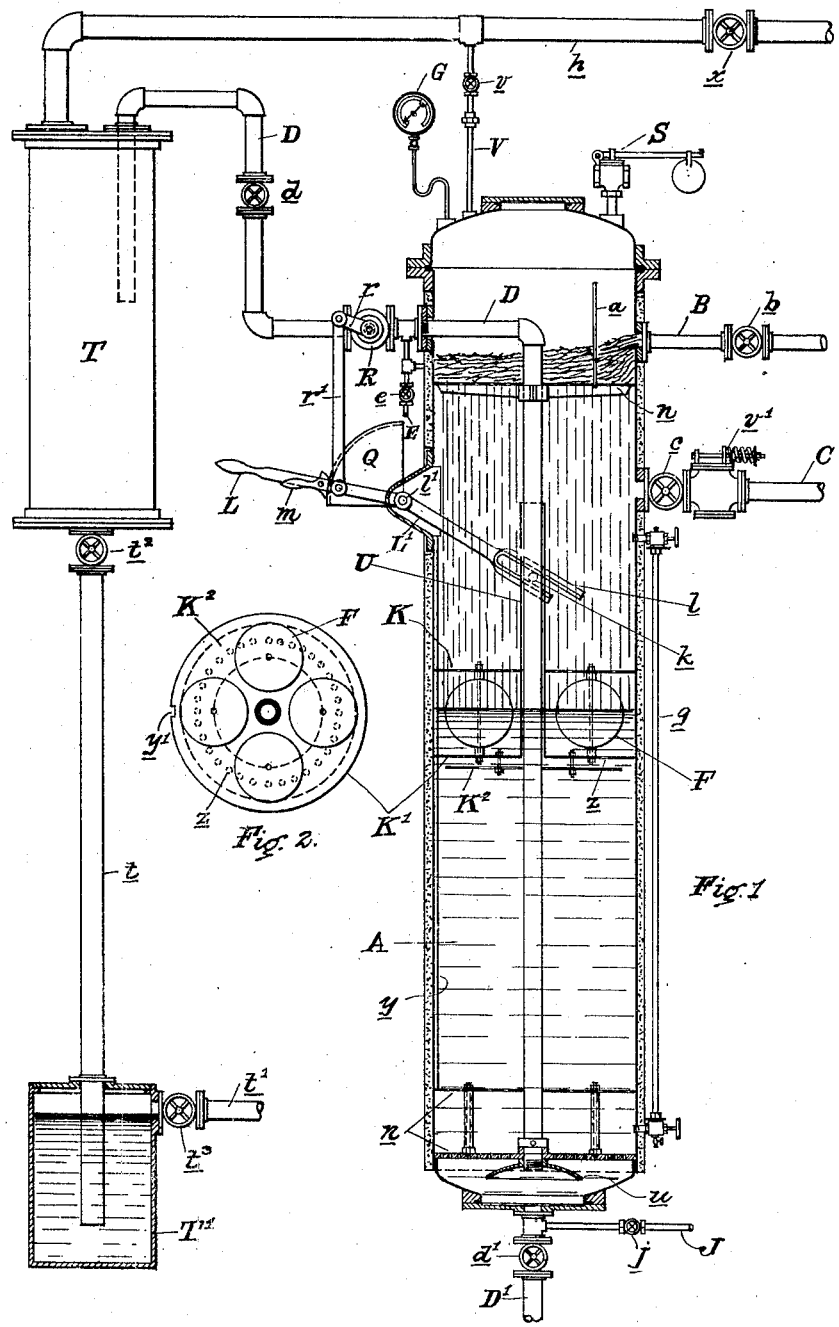
WITNESSES:
Colin D. Smith
Wm. A. McMahon
INVENTOR:
S. Morris Lillie

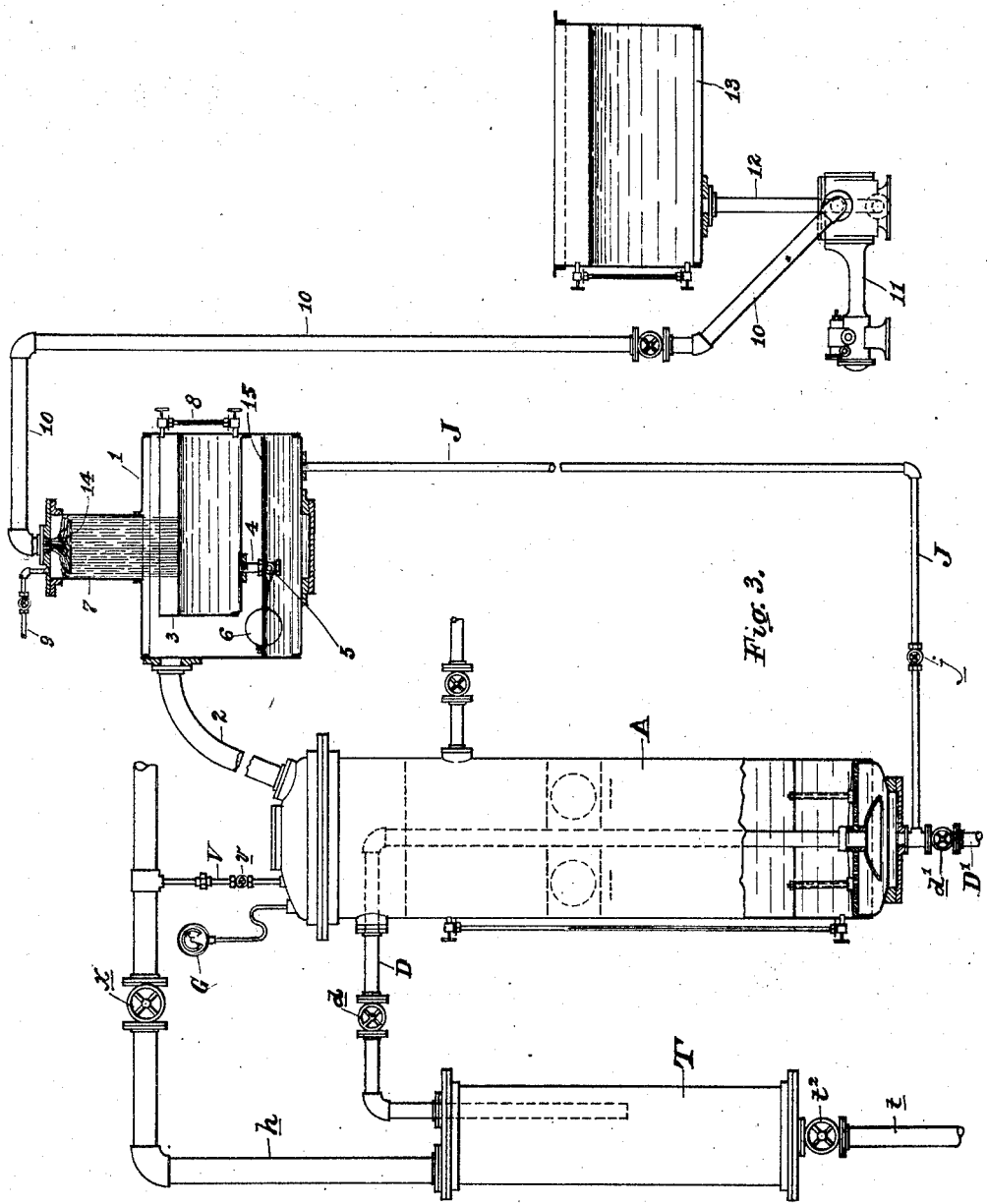

UNITED STATES PATENT OFFICE.

SAMUEL MORRIS LILLIE, OF PHILADELPHIA, PENNSYLVANIA.

APPARATUS FOR THE CONTINUOUS CONVERSION OF STARCH INTO GLUCOSE AND OTHER DERIVATIVES.

1,038,397.

Specification of Letters Patent.   Patented Sept. 10, 1912.

Application filed April 15, 1912.   Serial No. 691,073.

*To all whom it may concern:*

Be it known that I, SAMUEL MORRIS LILLIE, of Philadelphia, Pennsylvania, have invented new and useful Improvements in Apparatus for the Continuous Conversion of Starch into Glucose and other Derivatives, of which the following is a specification.

My invention relates to apparatus for practising the process of continuously converting starch to glucose and other derivatives set forth in my U. S. Patents #959,237, May 24, 1910, and #1,014,311, January 9, 1912, which process briefly stated is as follows: The process of treating the starch consists in mixing the starch with water and acid to form a mixture of the desired mobility and acidity in quantities sufficient to supply requirements; in forcing the said mixture of starch, water and acid continuously and at a uniform rate of flow, corresponding to the quantity of product wanted, through suitable heating devices and heating it therein under pressure to the desired converting temperature, say 280 degrees Fahr., making this heating period so brief that the starch mixture on leaving it will have suffered only a partial conversion; in delivering this but only partially converted heated mixture with an even distribution over the cross section of a column of the mixture, to which no more heat is added, moving uniformly through a containing vessel in which vessel the pressure is maintained not less than that corresponding to the converting temperature to which the mixture has been raised; in withdrawing from the end of the column the mixture at the same rate at which it is being delivered to the column at the opposite end, i. e., the uniform rate necessary to produce the desired quantity of product in a given time; in varying the length or depth of the said column of mixture to vary the length of time the liquors shall be subject to the converting temperature and thereby vary the degree of conversion; and finally in neutralizing the acid in the mixture by means of a suitable re-agent, approximately at the time it leaves the end of the column, or just prior to this.

My present invention relates to means for automatically controlling the duration of the stay of the starch liquor in the converting vessel, and therefore its degree of conversion, and it also relates to means for delivering a solution of the neutralizing agent into the converted liquor while still under pressure.

Referring to the drawings: Figure 1 shows a vertical axial section of the converting cylinder A, disclosing the mechanism for automatically controlling the stay of the starch liquor in the same, and also shows connected vessels into which the converted starch liquor passes from the converting vessel. Fig. 2 is a plan view of the floating diaphragms in the vessel A. Fig. 3 shows a combination of apparatus for delivering solution of the neutralizing reagent into the converted starch liquor.

Referring to Fig. 1, the vertical cylinder A is the converting vessel or converter. In it are contained a number of fixed horizontal perforated diaphragms $n$ of approximately the same diameter as the interior of the cylinder. Two of these diaphragms are located near the bottom of the cylinder and another toward the top of the cylinder at a point somewhat distant above the highest elevation the surface of the converting column will reach under normal working. B is a feed pipe which opens into the cylinder above the uppermost diaphragm. A discharge pipe D, shown axial in the figure, extends from below the lowest diaphragm where it is fitted with the inverted cup $u$ up through all the diaphragms and through the side of the cylinder above the upper diaphragm and leads into a closed tank T, hereinafter referred to as "pressure reducing tank," which has an outlet above through the pipe $h$ fitted with valve $x$ which pipe leads into a spray condenser or starch liquor heater, as described in my above mentioned patents. Below, the tank T has a drain pipe $t$ fitted with valve $t^2$ which pipe leads down into and nearly to the bottom of the sealing tank T'—which tank has an overflow pipe $t'$. This tank T' is sufficiently below the tank to seal the pipe $t$ should there be a considerable vacuum in the tank T. The discharge pipe D is fitted with a hand valve $d$ and with a valve R automatically operated as hereinafter described. Pipe D' fitted with a valve $d'$ leads from the bottom of the cylinder A and serves for draining the same, if desired. In addition to the fixed perforated diaphragms n there are two movable or floating perforated diaphragms K and K'. These diaphragms are built on a sleeve U which surrounds the discharge pipe D loosely and is free to move up and down the same. Between the two diaphragms are floats F, shown in the drawings as four in number, which are placed between the diaphragms and to which the two diaphragms are attached respectively above and below the floats. The construction of this floating pair of diaphragms is shown in plan in Fig. 3. The upper diaphragm is perforated approximately throughout its entire surface, the lower diaphragm has perforations $z$ arranged in a circle concentric with the cylinder and fastened to the lower diaphragm, and supported below it is a metal ring $K^2$ directly underneath the circle of perforations so that any liquor passing downward through the perforations impinges upon the metal ring below and is deflected horizontally on each side. The sleeve U bears on opposite sides two pins $k$ which engage into fork $l$ at the end of the lever L'. The other end of the lever L' is fixed upon an arbor $l'$, located in a projection on the side of the cylinder A, which arbor extends through the side wall of the projection and has securely fixed on its outer extremity the arc Q and also bears loosely the lever L which lever has pivoted to it the eccentric lever $m$, which when thrown into one position bears against the edge of the arc Q and binds the lever L to it, and which, thrown into another position, frees the lever L from the arc. Pivoted to the lever L is one end of the connecting rod $r'$, the other end of which is pivoted to the lever $r$ of the valve R, in such fashion that raising the lever L closes the valve R and lowering lever L opens the same. Consequently, when the lever L is bound to the arc Q by the eccentric lever $m$ the raising of the lever L' by the float diaphragms K opens the valve R in proportion as they rise and, as the lever L' is lowered by the float diaphragms, it closes the valve R in proportion as the diaphragms fall. The length of the slot $l$ in the end of the lever L' is so proportioned that the valve R is fully closed just as the pins $k$ are carried out of the slot by the falling of the float diaphragms K. Should the float diaphragms rise, the pins $k$ enter the slot and a further rise of the same opens the valve to a degree depending upon the extent of the rise. The lever L' is heavy enough so that when the lever L is disengaged from the arc Q the lever L' will move into its lowermost position and the arc Q into its uppermost position. This movement might be effected by a spring, suitably arranged on the arbor $l'$ for example. A vertical rib $y$ on the inner surface of the cylinder A engages in the notch $y'$ in the edges of the diaphragms K K', and prevents any turning of the latter and of the sleeve U and its pins K on the pipe D.

C is a steam pipe which opens into the vessel A below the upper diaphragm, but above the level to which the converting column of liquor will in practice ever rise as hereinafter described. The pipe C is fitted with a hand-valve $c$ and also with a pressure reducing valve $v'$. The cylinder A is provided with safety valve S, pressure gage G, air vent pipe V, with valve $v$, leading into the pipe $h$ and also with provisions for indicating the height of liquor in the vessel, such as the gage glass $g$ on the side of the same. A small test pipe E with valve $e$ leads into the atmosphere from the discharge pipe D at a point between the valve R and the converting vessel. A small pipe J, fitted with valve $j$, leads into the cylinder A below the lower diaphragm in the same, and immediately under the inverted cup $u$ of the discharge pipe D. The vent pipe $a$ affords communication between the spaces above and below the uppermost diaphragm $n$.

The method of using the apparatus described above is as follows: Air is first displaced by steam from the various parts of the empty apparatus. The floating diaphragms K, K' are resting at the bottom of the empty vessel A and the lever L is disengaged by the eccentric lever $m$ from the arc Q and is moved up to just close the valve R. The lever L' is resting in its lowest position and the arc Q in its uppermost position. The parts are so arranged that when in their several positions just named the lever L is in position to be engaged by the eccentric lever $m$ with the arc Q near the lower end of the arc. The valve $c$ in the high pressure steam pipe C to the vessel is then opened, the pressure reducing valve $v'$ is set to maintain the converting pressure, or a little above, in the vessel A, the relief valve S set to relieve the pressure in A should it rise above normal, i. e. above a pressure corresponding to a temperature a little above the converting temperature. The acidified starch liquor may now be started at the uniform rate of speed desired through the preliminary heating system by which the starch liquor is quickly heated to approximately the converting temperature say 280° Fahr. and with but little conversion and led thus heated into the converting vessel A through its feed pipe B. Entering the vessel A, it showers through the atmosphere of steam therein, and if it has entered below the desired temperature it is brought to it by contact with this steam. If materially above the converting temperature and pressure it is lowered by the escape of steam through the safety valve S. When starting operations the heated starch liquor entering the vessel A gradually fills the vessel, the floating diaphragms K, K' rising with the surface of the liquor. The showering liquor impinges upon the upper diaphragm K—which breaks the force of its fall—falls through it gently upon the surface of the liquor between the two plates, flows through the circle of holes $z$, in the lower plate K', and by the ring K below the holes is delivered horizontally and smoothly into the body of the liquor with very little agitation of the latter vertically, a condition favorable to a uniform conversion. The valve $e$ in the pipe E is kept slightly opened and there is a constant flow of the hot starch liquor from the pipe D through the pipe E, samples taken from which at any time indicate very closely the condition of the liquor which would discharge into the closed tank T were the valve R opened.

The length of the sleeve U, the location of the pins K on it, the location and length of the forked lever L', are so arranged that with the lever L' in its lowest position, the pins K will be engaged with the lever by the rising level of the starch liquor—when operating with the temperature and acidity at given degrees—before the lowest degree of conversion which may be desired is reached, and also so that the highest conversions which might be desired would be arrived at considerably before the lever L' had passed through its entire range of movement. The valve R is so constructed that to change it from wide open to closed, or vice versa, requires a movement of the lever L through but a small arc and consequently of the lever L' also, if the lever L be bound to the arc Q by the means of the eccentric lever $m$. By "wide open" is meant sufficiently open to allow the liquor to discharge at the maximum rate. When starting the converting apparatus of Fig. 1, as above described, the eccentric lever $m$ is turned to release the lever L from the arc Q—which allows the lever L' to fall to its lowest position, and move the arc Q into its highest—and the lever L is moved to bring the valve R into its closed position which brings the lever L into position to be bound by the eccentric $m$ to near the lowest point of the arc Q, $i. e.$ into the position shown in Fig. 1. Before the liquor flowing away from the discharge pipe D through the test pipe E shows the desired degree of conversion in samples taken from the same, the pins $k$ of the sleeve U will, as hereinbefore explained, be engaged in the slot of the lever L', and the latter and the arc Q be revolving with the rising of the liquor in vessel A. At once, or perhaps a little before the samples of liquor flowing from the sampling pipe E show the desired degree of conversion the lever L is bound to the arc Q by the eccentric $m$, and the hand valve $d$ in the discharge pipe D is opened. The rising of the level of the liquor in A now causes the lever L to move downward and, through the connecting rod $r'$ and valve lever $r$, move the valve into increasingly open positions. A little further rise in the liquor level will open the valve sufficiently to make the outflow of liquor from A to be equal to the inflow of the starch liquor into A, and as this inflow is at a constant rate and the pressure in the vessel A is practically constant, all the starch liquor passing through the vessel A will be in it for the same length of time and will be converted to the same degree, and this constancy will be maintained automatically by the operation of the mechanism described so long as the temperatures, acidity and rate of flow of the starch liquor through the apparatus continue constant. To change the degree of conversion, as indicated by samples taken from E, to a greater degree loosen the lever L from the arc Q by moving the eccentric $m$, pull down the lever L to close the valve R. The level of the liquor in A will now rise progressively and the samples taken from E show increasing degrees of conversion until the desired greater degree of conversion is reached. Then the lever L is at once bound to the arc Q by the eccentric $m$ and this greater degree of conversion is maintained. Were a lower degree of conversion wanted instead of a higher, then after releasing the lever L from the arc Q, as indicated, the valve R would be opened wider to permit a greater flow of liquor from the vessel A, the level of the liquor in A would fall progressively, and also the degree of conversion shown by samples taken from the pipe E. When this approaches the lower degree of conversion wanted the lever L is bound to the arc Q by the eccentric $m$. The level of the liquor in A at that time will be automatically maintained, and the liquor will come away converted to a degree somewhat less than that shown by sample flowing from E at the time of binding the lever L to the arc Q. In adjusting or setting this regulating mechanism to obtain a given degree of conversion, it may prove to be not quite right the first time, and one or more adjustments may be necessary to get the right conversion. This will especially be the case when lowering the level of the liquor to obtain a lower conversion. Should at any time the desired degree of conversion call for a level of the liquor in A not high enough to bring the lugs K of sleeve U into contact with the lever L', then the valve R must be left open and the regulation of the flow of liquor through the pipe D be done by the hand valve $d$. Other arrangements for automatically maintaining the level of the liquor in A at a desired elevation may be employed without departing from the scope of my invention. Discharge of the liquor through the pipe D into the closed tank T is thus made to be at the same constant rate at which the starch liquor is entering the vessel A, (*i. e.*, the rate it is entering upon preliminary heating) and in consequence all the liquor flowing from the pipe D has been subjected to the action of the acid and of the constant temperature the same length of time, and has approximately the same degree of conversion. In the tank T a lower pressure is maintained than in the vessel A and due to this lower pressure, vapor is generated in the tank T from the liquor, and this vapor escaping through the pipe $h$ is used in the process of my said patents for heating purposes. The converted starch liquor flows from the tank T down through the pipe $t$, the valve $t^2$ being open, into the closed sealing tank T', and passes away through its overflow $t'$. The valve $t^3$ in the latter permits of throttling this overflow if it is desired to carry a pressure above atmospheric in the tank T. Again the liquor in the sealing tank T' prevents air passing up into the tank T should a partial vacuum be maintained therein.

Neutralization of the acid in the converted liquor may be done simultaneously with the passage of the liquor from the converter, in which case the resultant flash vapors are approximately neutral and non-corrosive, or it may be done after the disengagement of the flash vapors in the tank T, in which case resultant vapors would carry with them considerable acid, which would be absorbed in the starch liquors were these vapors employed in heating the starch liquors in the preliminary heating system, as is done for example in the apparatus shown in my U. S. Patent #959,237, May 24th, 1910. The acid thus absorbed would lessen the amount of fresh acid needed in the starch liquors to give them the degree of acidity desired for the converting process.

I do not limit my invention to the particular construction or details of apparatus set forth in this specification and accompanying drawings.

I claim as of my invention:—

1. In a starch converting vessel of the character described into which the starch liquor is delivered above the surface of the starch liquor therein, devices for distributing the entering liquor over the surface of the body of the starch liquor, and means for supporting said devices near the surface of the liquor through the agency of the liquor.

2. In a starch converter of the character described into which the starch liquor is delivered above the surface of the starch liquor therein, means for distributing the falling liquor over the surface of the liquor supported on floats resting on the surface of the starch liquor and rising and falling with it.

3. In a starch converter of the character described into which the starch liquor is delivered above the surface of the liquor therein, a perforated distributing plate in combination with a float construction adapted to float in the liquor and support the perforated plate near the surface of the liquor.

4. In a starch converter of the character described into which the starch liquor is delivered above the surface of the liquor therein, two perforated plates supported one above the surface of the liquor and the other a short distance below the said surface by a float construction adapted to float in the liquor and rise and fall with the surface of the same.

5. In a starch converter of the character described into which the starch liquor is delivered above the surface of the liquor therein, a device for distributing the liquor over the surface of the liquor in the converter consisting of two horizontally disposed perforated plates, a float construction between the two plates, and means for fastening the two plates and the float construction together.

6. In a starch converter of the character described, a vertical discharge pipe for the liquor within the converter, a loose sleeve on the discharge pipe, a float construction attached to the sleeve and liquor distributing means supported by the float construction, the combination being adapted to rise and fall with the surface of the liquor in the converter.

7. In a starch converter of the character described, a float construction resting upon the surface of the liquor in the converter and supporting liquor distributing device, a liquor discharge pipe for the converter, a valve in the said discharge pipe, interconnecting mechanism between the said valve and float construction operating to open the valve as the liquor surface and the float construction rise, and as they fall to close the valve, and means for delivering the starch liquor into the converter.

S. MORRIS LILLIE.

Witnesses:
 M. T. MACTAGUE,
 COLIN D. SMITH.